Nov. 30, 1965    V. W. SMITH    3,220,425
LUBRICATING DEVICE
Filed Nov. 27, 1963

INVENTOR.
VERN W. SMITH
BY
BYRON, HUME, GROEN & CLEMENT
ATTORNEYS.

# United States Patent Office 3,220,425
Patented Nov. 30, 1965

3,220,425
LUBRICATING DEVICE
Vern W. Smith, Champaign, Ill.; Dora F. Smith, executor of said Vern W. Smith, deceased
Filed Nov. 27, 1963, Ser. No. 326,467
3 Claims. (Cl. 134—168)

This invention relates to apparatus for cleaning or lubricating passageways and, more particularly, to apparatus for cleaning or lubricating passageways with an an explosive cartridge means.

Frequently, lubrication passages in machines, motors, bearsings, or the like, become clogged by hardened grease or other material. Heretofore known devices for unclogging lubrication passageways and the like include devices adapted to fire explosive cartridges and to direct the high pressure gases created into the lubrication passageway, the passage of the high pressure gases through the lubricating passageway carrying the clogging material from the passageway. Such devices have not, however, been particularly satisfactory, as the highly corrosive combustion products of an explosive cartridge enter the lubrication passage of the like and may create serious corrosive effects upon the machinery. Furthermore, these devices do not lend themselves to the use of liquid solvents, cleaning solutions, lubricating fluids or the like, which are more effective in cleaning the lubrication passageway. Also, the pressure of the gases created by the explosive cartridge, if introduced directly into the machine or bearings, may be excessive and damage the machine or bearings.

It is, accordingly an object of this invention to provide apparatus for forcing fluid into a lubrication passageway, such as a grease fitting or the like, by utilizing the extremely high pressure created by an explosive cartridge means while preventing the combustion products of the explosive cartridge means from entering the lubrication passageway.

It is a further object of this invention to provide apparatus for unclogging hardened grease or other material in a lubrication passageway by forcing solvent, penetrating oil, lubricating oil, uncontaminated air, gas or the like under high pressure into the passageway.

It is another object to provide a device which may also be utilized to inject grease or other lubrication into a grease fitting or other lubrication passageway.

It is a further object to accomplish the above objects by means of a safe, mechanically simple and reliable device which can be operated by hand.

These and other objects more apparent hereinafter are realized by the apparatus of the present invention which is actuated by an explosive cartridge and adapted to expel fluid or gas, other than the combustion products of the explosive cartridge, under high pressure into a lubrication passageway or the like to clean and/or lubricate the passageway.

The invention, together with further objects and advantages thereof, will best be understood by reference to the following description taken in conjunction with the accompanying drawings, in which.

Figure 2:
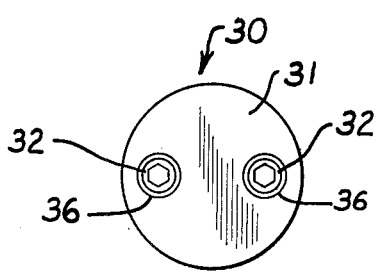
FIGURE 2 is a top plan view of the device of FIGURE 1.
Figure 3:
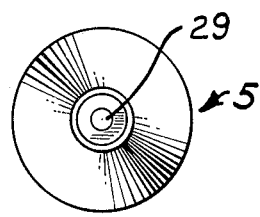
FIGURE 3 is a bottom plan view of the device of FIGURE 1.
Figure 1:
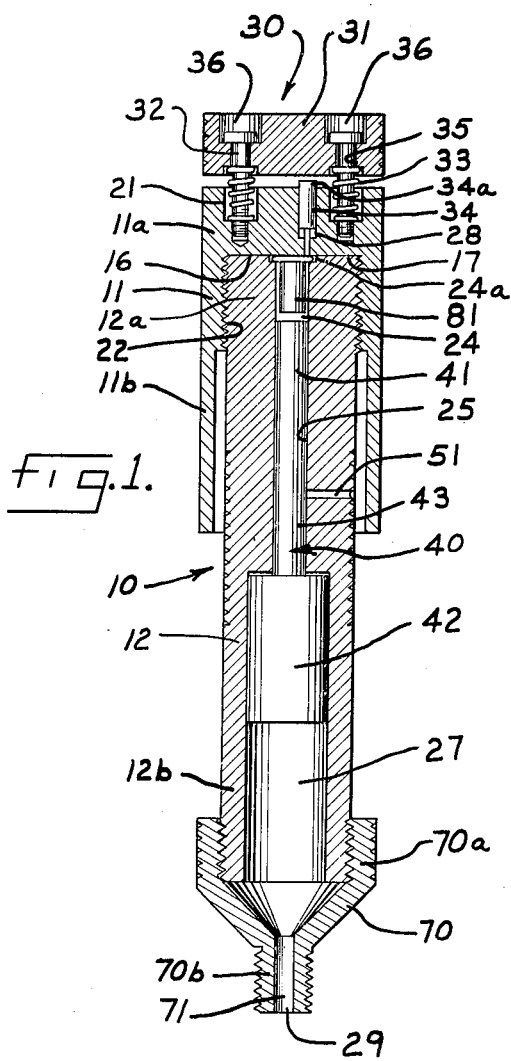
FIGURE 1 is a cross-sectional view of a device embodying the features of the present invention.

Referring to the drawings, and more particularly to FIGURES 1–3, there is illustrated a device for cleaning or lubricating a lubrication passageway embodying the features of the present invention and indicated generally by reference numeral 5. The device 5 is adapted to fire explosive cartridges and utilize the high pressure gases created thereby to drive cleaning or lubricating fluid under high pressure into a lubrication passageway. To these ends the device 5 comprises generally in body means 10, a piston means 40, a firing mechanism 30, and a connector means 70. The body means 10 is adapted to hold an explosive cartridge 81 and to confine and direct against the piston means 40 the high pressure gases created when the cartridge 81 is fired. The body means 10 is also adapted to support the piston means 40 and to provide a chamber for the lubricating or cleaning fluid which is acted upon by the piston means 40. The connector means 70 on body means 10 contains an outlet passage 29 through which the lubricating or cleaning fluid passes under high pressure to a lubrication passageway.

The body means 10 is constructed in two separate sections; a first body member 11 and a second body member 12. The first body member 11 is a cylindrical, cup-shaped body with a base 11a and an annular wall 11b. An interior surface 16 of the base 11a is machined to form a smooth, flat surface. The base 11a further contains a plurality of drilled and tapped holes 21 for securing the firing mechanism 30. A passageway 28 is drilled or otherwise formed through base 11a to receive a firing pin 34. The annular wall 11b is machined or formed so that its interior diameter is greater than the outside diameter of body member 12, except at its interior end containing a threaded surface 22.

The second body member 12 is formed in a generally cylindrical shape and has one end adapted to be threadably attached to the cup-shaped body member 11. The body member 12 contains a smooth walled cylindrical passageway 25 drilled or bored along its central axis. One end of passageway 25, at an end 12a of body member 12, forms an explosion chamber 24. The second body member 12 is adapted to hold an explosive cartridge 81 in this explosion chamber 24. For convenience of manufacture, the explosion chamber 24 and the passageway 25 are here formed to the same diameter. Thus, if a .22 caliber blank cartridge 81 is to be used, the passageway 25 and the explosion chamber 24 are formed to a diameter of approximately .22 caliber, so that the cartridge 81 will fit closely within the explosion chamber 24. The outer end of the explosion chamber 24 is counterbored to a larger diameter 24a to receive the rim of the explosive cartridge 81 when it is inserted fully into the explosion chamber 24. The counterbore 24a is of sufficient depth so that the base of the inserted cartridge 81 will be flush with an end surface 17 of the body member 12. The end surface 17 of the body member 12 at the end 12a forms a smooth surface perpendicular to the axis of the body member 12.

The end 12a of the body member 12 is threaded and adapted to engage the threaded surface 22 of the body member 11. The body members 11 and 12 are securely fastened together in this manner. When they are so secured, the end surface 17 of the body member 12 presses tightly against the inner surface 16 of the base 11a. The explosive cartridge 81 in the explosion chamber 24 will thereby be securely retained and the gases from the explosive cartridge 81 may not escape between the surfaces 16 and 17.

The end 12b of the body member 12 has formed therein a smooth walled cylindrical chamber 27. The chamber 27 is intended to contain the cleaning or lubricating fluid that is to be expelled under high pressure into the lubrication passage to be acted upon in the operation of the device 5. In the present embodiment the chamber 27 is a cylindrical counterbore formed on the same axis as the passageway 25, but having a larger inside diameter than the passageway 25. The opposite end 12b of the body member 12 is threaded at its circumference in order to be attachable to the connector means 70.

The connector means 70 has an end 70a which contains interior threading adapted to engage the end 12b of the body member 12. The other end 70b of the connector means 70 is adapted to engage the passageway (not shown) to be lubricated or cleaned and to these ends has exterior threading. The interior of the connector means 70 is hollow and communicates with chamber 27 when the body member 12 and the connector means 70 are threadably attached. The connector means 70 has an outlet passage 71 through which the fluid in chamber 27 passes on its way to the pasageway (not shown) to be cleaned and/or lubricated.

The firing mechanism 30 includes a firing head 31 movably attached to the body member 11. This is achieved by a plurality of bolts 32 each having a shaft fitting slidably through a hole 35 in the firing head 31 and having a head fitting within a corresponding recess 36 in the upper portion of the firing head 31. Each of the threaded ends of the bolts 32 are screwed into the drilled and tapped hole 21 in the end 11a of the body member 11. A coil spring 33 is mounted on each bolt 32 between the firing head 31 and the body member 11 and is adapted to forcibly hold the firing head 31 in spaced relationship from the body member 11. The recesses 36 in the firing head 31 allow the firing head 31 to move toward the body member 11 without exposing the heads of the bolts 32. The bolts 32 shown here are of the Allen head type, but any other type of bolt with a head larger than the shaft may be used to movably secure the firing head 31. A firing pin 34 is slidably fitted within the passageway 28 in the body member 11. The firing pin 34 is positioned so that its pointed extremity bears against the base of the explosive cartridge 81 and an opposite end 34a thereof extends beyond the base 11a of the member 11.

In the operation of the firing mechanism 30, the firing head 31 is struck on its upper surface by the hand or any suitable instrument, causing the firing head 31 to move toward the body member 11. In so doing, the firing head 31 will strike the extended extremity 34a of the firing pin 34 and thereby drive the pointed extremity of the firing pin 34 into the base of the explosive cartridge 81. This causes the cartridge 81 to fire. The firing mechanism 30 lends itself to a simple safety arrangement, such as a flat plate (not shown) which may be inserted between the firing head 31 and the body member 11.

The piston means 40, as shown in FIGURE 2, is slidably enclosed within the body means 10. The piston means 40 is here a unitary structure having a first piston portion 41, a second piston portion 42, and a connecting portion 43. The first piston portion 41 serves as a gas piston to confine and utilize the high pressure gases produced by the explosive cartridge 81. The second piston portion 42 is adapted to act upon the fluid contained in the chamber 27 and expell it under high pressure through the outlet passage 71 to the passageway to be cleaned and/or lubricated. The connecting portion 43 serves to transmit the force from the first piston portion 41 to the second piston portion 42.

The first piston portion 41 is smoothly finished to a diameter corresponding closely to that of the inside diameter of the passageway 25. In this manner, the first piston portion 41 forms a gas-tight slidable seal with the walls of the portion of the passageway 25 in which it rides. The piston connecting portion 43 is here simply an extension of the first piston portion 41. Together they comprise a solid rod of uniform diameter. The second piston portion 42 is intended to drive the fluid contents of the chamber 27 out through the passage 71 of the connector means 70 with high pressure. Consequently, like the piston portion 41, it is smoothly finished and fits with close tolerance inside the bore in which it rides, which is the chamber 27 in the body member 12.

The connector means 70 comprises a threaded extension 70b which contains the outlet passageway 71 in the form of an axial bore communicating with the chamber 27. The connector means 70 is intended to provide a secure connection between the lubrication passageway to be acted upon and the body means 10, so that the high pressure exerted on the liquid or gas being forced through the outlet passageway 71 may be fully exerted on the lubrication passage. Threaded extension 70b is intended to fit, for example, directly into the threaded hole provided for a standard grease fitting (not shown). The grease fitting may be unscrewed and the threaded extension 70b screwed directly into this hole. Further coupling apparatus may be utilized, such as flexible pressure tubing, swivel or right angle connectors, etc. (not shown) which may be screwed to the threaded extension 70b and then connected to the passageway to be cleaned or lubricated. A further utilization of the extension 70b would consist of pressing the extremity of the outlet passageway 71 over the projection on a standard projecting type grease fitting while the device 5 is operated. It is to be appreciated that numerous other connector means may be utilized. An additional feature which adds to the safety and effective operation of the device 5 comprises a gas escape port 51 in the body member 12. The gas escape port 51 communicates with passageway 25 and is so situated that high pressure gases created in the explosion chamber 24 are allowed to escape from the body member 12 when the piston means 40 has been moved substantially fully downward by the force of the explosion. The wall 11b of body member 11 is spaced from the body member 12 to deflect gases escaping from the gas escape port 51, thus preventing danger to the operator of the device 5. The gas escape port 51 also serves as a vacuum relief.

The operation of the device 5 is very simple. First, the desired fluid to be used should be selected and placed in the chamber 27. If the device 5 is to be used to unclog a lubrication passageway clogged with hardened grease, it is preferred to first flush the passageway with lightweight penetrating oil or solvent and then to lubricate the passage way with normal lubricants. For ordinary lubrication, the particular oil or grease required for the particular application would be selected. If light oil or solvent is used, a small dab of grease may be used to seal temporarily the outlet passageway 71 to prevent fluid within the chamber 27 from escaping until the device 5 is actuated. It is also possible to use with this device 5 a plug or capsule (not shown) constructed of some rupturable material, such as gelatin, plastic, or metal foil, to contain the penetrating fluid or light oil.

The most convenient method of loading the device is simply to fill the chamber 27 with the desired liquid. This may be accomplished either by inserting the liquid into outlet passageway 71 or by unscrewing the connector means 70 and filling chamber 27 directly. Of course, if it is desired to expel air instead of liquid, this may be accomplished simply by raising the piston means 40 to its initial position, as air will then enter the chamber 27. Because of the close fitting relationship between the piston means 40 and the body member 12, the piston means 40 may be pushed upwardly to its initial position and will remain there until the device 5 is operated.

With the proper fluid selected and inserted in the chamber 27, the connector means 70 may then be secured to the lubrication passageway as described above. The only further step necessary for the operation of the device is the insertion and firing of an explosive cartridge 81. This is accomplished simply by unscrewing the body member 11 from the body member 12 and inserting the explosive cartridge 81 in the explosion chamber 24. Then the body member 11 must be tightly screwed to the body member 12. Upon proper positioning or removing of the safety mechanism, if any, the firing head 31 may be struck by the hand or with some instrument, which will cause the firing pin 34 to fire the explosive cartridge 81. The high gas pressure created by firing the cartridge 81 will exert considerable force on the upper surface of the first piston portion 41, which is initially situated in the upper part of the passageway 25. This will drive the first piston portion 41 down passageway 25, exerting a high degree of force upon the connecting portion 43. The connecting portion 43 will exert an equivalent high force on the second piston portion 42, moving it down the bore in which it rides, which is the chamber 27. Thus, the contents of the chamber 27 will be driven out of the outlet passageway 71 under high pressure. When the device 5 has been connected by the connector means 70 to a clogged lubrication passageway, the effect of the high pressure combined with the solvent action of a fluid is to quickly remove the obstruction in the lubrication passageway.

Of course, the device 5 may be utilized equally as well for normal lubrication of an unclogged passageway. In this application, the high pressure created is not essential, but it effects an extremely rapid and convenient method of lubrication. The amount of lubricant to be applied may be controlled simply by varying the amount of lubricant inserted in the chamber 27.

Figure 4:
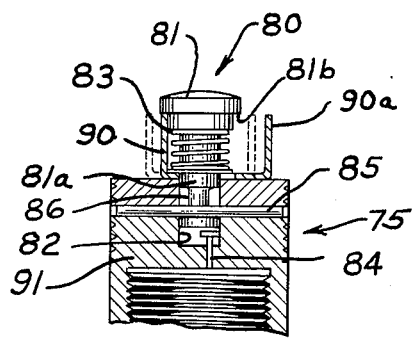
FIGURE 4 is a fragmentary side view, partially in cross-section, of a modified device embodying the features of the present invention.

Referring now to FIGURE 4, there is illustrated a portion of the modified device 75 embodying the features of the present invention. The device 75 is substantially the same as the device 5 described hereinbefore. The same reference numerals indicate identical parts and that portion of the device 75 not illustrated is the same as the device 5. The device 75 has a firing mechanism 80 incorporating a safety member 90. A firing head 81 has an extension 81a extending into a recess 82 in the body member 91 which is otherwise similar to body member 11. A coil spring 83 on the extension 81a serves to hold the firing head 80 away from the body member 91. The safety member 90 may be formed from a flat piece of metal or other suitable material, two opposite ends of which form upward projections 90a. A slot is formed in the safety member 90 of sufficient width to allow the extension 81a of the firing head 81 to freely fit therethrough and of sufficient length to allow the safety member 90 to move slidably with respect to the firing head 80. The spring 83 holds the safety member 90 against the body member 91. A firing pin 84 corresponds generally to the firing pin 31. The extension 81a of the firing head 81 is adapted to strike the head of the firing pin 84 and thus fire the explosive cartridge 81. A removable fastening pin 85 mounted in a corresponding passage in the body member 91 secures the firing head 81 to the body member 91. The pin 85 passes through an annular retaining groove 86 in the extension 81a. The retaining groove 86 is wide enough to allow the firing head 81 to be moved freely back and forth in the body member 91. When the safety member 90 is in the position shown in solid lines (the safety position), one of its two upward projections 90a is so situated as to strike a horizontal annu- 81b. This is the firing position, and the firing head 81 is moved toward the body member 91. Thus, the firing mechanism 80 is prevented from operating, as the firing head extension 81a may not move downward sufficiently to strike the firing pin 84. When the safety member 90 has been moved to the position indicated by dotted lines, neither projection 90a is positioned to strike the surface 81b. This is the firing position, and the firing head 81 may now be moved downwardly toward body member 91 to actuate the firing pin 84.

Numerous variations in the device of the invention are possible. For example, any number of variations in the construction of the body means 10 would be obvious to one with ordinary skill in the art. The division of the body means 10 into the members 11 and 12 is merely one convenient arrangement for constructing or manufacturing the body means 10. The explosion chamber 24 could be formed in the side of body member 12 and communicate with the passageway 25 at an angle. The passageway 25 need not be continuous or extend through the body member 12 at a constant diameter. The body members 11 and 12 and the connector means 70 or any combination thereof, could be made as an integral unit. Further, the body member 12, for example, might contain only the passageway 25, having the chamber 27 contained within the connector means 70 or a further body member. Furthermore, any firing mechanism may be employed in the devices 5 and 75 as will be readily appreciated by one with ordinary skill in the art.

The devices 5 and 75 may be used for cleaning machines or other objects with high pressure air or gas. The device of the invention may be utilized to produce a blast of air, as the piston means 40 prevents combustion products from the explosive cartridge 81 from entering the outlet passageway 71.

The lightweight and small size of the devices 5 and 75 enables them to be easily carried by an individual and utilized where other equipment might not be convenient. An example of such an application would be in the pressure lubrication of farm machinery in the field.

While the embodiments described herein are at present considered to be preferred, it will be understood that various modifications and improvements may be made herein and it is intended to cover in the appended claims all such modifications and improvements as fall within the true spirit and scope of the invention.

What is desired to be claimed and secured by Letters Patent of the United States is:

1. A device for forcing fluid into a grease fitting or the like by means of an explosive cartridge, comprising firing means, body means in first and second sections, fluid connector means and piston means; said firing means comprising a firing pin slidably mounted in a recess through said first body section and a firing head movably attached to said first body section and adapted to strike said firing pin when said firing head is moved toward said first body section; said second body section being attached to said first body section and having an explosion chamber, a fluid chamber, and a passageway communicating with said explosion chamber, said passageway axially extending through said second body section and communicating with said fluid chamber, said second body section being further adapted to contain an explosive cartridge in said explosion chamber, and when said first and second body sections are attached said passageway presents the sole outlet from said explosion chamber and said firing pin in said first body section is positioned to strike the cartridge, said second body section also having a gas relief port communicating with said passageway at a point on said passageway remote from said explosion chamber; said fluid connector means being attached to said second body section and having a fluid outlet communicating with said chamber and means for attaching said fluid outlet to a lubrication passageway; and said piston means having a first portion in close fitting slidable relationship within said passageway a second portion in close fitting slidable relationship within said fluid chamber and connecting means adapted to transmit force applied to said first portion to said second portion, whereby the explosion of a cartridge in said explosion chamber actuates said piston means and said second piston portion forces the contents of said fluid chamber out said fluid outlet.

2. A high pressure lubrication device comprising the combination of: body means with first and second passageways therein, said second passageway having a substantially larger diameter than said first passageway and being adapted to contain lubricant therein, said body means being adapted to chamber an explosive cartridge in said first passageway; piston means including a first piston in substantially gas tight slidable relationship within said first passageway, a second piston spaced from said first piston and in close fitting slidable relationship within said second passageway, and connecting means between said first and second pistons for transmitting pressure on said first piston to said second piston; said body means having outlet means for connecting a lubricating passageway in communication with said second passageway; and cartridge firing means mounted to said body means for firing an explosive cartridge; said piston means being adapted to force the contents of said second passageway out through said outlet means with high pressure upon the firing of the cartridge.

3. The device of claim 2 wherein said cartridge firing means is adapted to be hand impact actuated and includes safety means positionable to prevent the actuation thereof.

References Cited by the Examiner

UNITED STATES PATENTS

| | | | |
|---|---|---|---|
| 1,388,854 | 8/1921 | Dezendorf | 15—406 |
| 2,147,593 | 2/1939 | Bracken | 134—168 |
| 2,494,298 | 1/1950 | Jones | 15—406 |
| 3,033,426 | 5/1962 | Young | 222—389 X |

FOREIGN PATENTS 202,156   8/1923   Great Britain.

ROBERT W. MICHELL, *Primary Examiner.*